US009807355B2

(12) United States Patent
Miyata

(10) Patent No.: US 9,807,355 B2
(45) Date of Patent: Oct. 31, 2017

(54) LIGHT SOURCE APPARATUS AND PROJECTOR HAVING LIGHT SOURCE APPARATUS

(71) Applicant: NICHIA CORPORATION, Anan-shi, Tokushima (JP)

(72) Inventor: Tadaaki Miyata, Yokohama (JP)

(73) Assignee: NICHIA CORPORATION, Anan-Shi (JP)

(*) Notice: Subject to any disclaimer, the term of this patent is extended or adjusted under 35 U.S.C. 154(b) by 0 days.

(21) Appl. No.: 14/967,617

(22) Filed: Dec. 14, 2015

(65) Prior Publication Data
US 2016/0173837 A1 Jun. 16, 2016

(30) Foreign Application Priority Data

Dec. 15, 2014 (JP) ................. 2014-253323

(51) Int. Cl.
H04N 9/31 (2006.01)
F21V 5/00 (2015.01)
(Continued)

(52) U.S. Cl.
CPC .............. H04N 9/3111 (2013.01); F21V 5/00 (2013.01); F21V 29/70 (2015.01); G02B 26/008 (2013.01);
(Continued)

(58) Field of Classification Search
CPC ........................... G03B 21/204; G03B 21/208; G03B 21/2013; G03B 21/2033; G03B 21/2066;
(Continued)

(56) References Cited

U.S. PATENT DOCUMENTS

2012/0147332 A1* 6/2012 Huang ............... G03B 21/2013
353/31
2012/0249972 A1 10/2012 Kurosaki
(Continued)

FOREIGN PATENT DOCUMENTS

JP 2011-133782 A 7/2011
JP 2012-103615 A 5/2012
(Continued)

OTHER PUBLICATIONS

European Search Report application No. 15199826.7 dated May 16, 2016.

Primary Examiner — Sultan Chowdhury
(74) Attorney, Agent, or Firm — Squire Patton Boggs (US) LLP

(57) ABSTRACT

A light source apparatus comprising light sources including laser diodes and collimating lenses, a condenser lens, and a transmissive phosphor wheel. The collimating lens and laser diode are placed with a first shift such that an optical axis of the collimating lens is shifted from that of light from said laser diode in the direction perpendicular thereto. The laser diodes include a first laser or second diode where a direction of a short axis of a condensed shape is placed in a first or second direction, and a second laser diode where a direction of a short axis of a condensed shape is placed in a second direction. The collimating lenses corresponding to said first laser diode and the second laser diode are placed with a second shift in a direction of the optical axis of said collimating lens.

20 Claims, 10 Drawing Sheets

(51) Int. Cl.
*F21V 29/70* (2015.01)
*G02B 26/00* (2006.01)
*G03B 21/20* (2006.01)

(52) U.S. Cl.
CPC ....... *G03B 21/208* (2013.01); *G03B 21/2013* (2013.01); *H04N 9/3161* (2013.01); *G03B 21/204* (2013.01); *G03B 21/2046* (2013.01)

(58) Field of Classification Search
CPC .. H04N 9/3152; H04N 9/3161; H04N 9/3164; H04N 9/3197
See application file for complete search history.

(56) References Cited

U.S. PATENT DOCUMENTS

| | | | | |
|---|---|---|---|---|
| 2013/0088471 | A1* | 4/2013 | Kitano | H04N 9/3114 345/208 |
| 2013/0100423 | A1* | 4/2013 | Yamagishi | G03B 33/08 353/98 |
| 2013/0114049 | A1* | 5/2013 | Li | G03B 21/2013 353/84 |
| 2013/0194552 | A1* | 8/2013 | Matsubara | G03B 21/2013 353/31 |
| 2013/0242534 | A1* | 9/2013 | Pettitt | G03B 21/204 362/84 |
| 2014/0036241 | A1 | 2/2014 | Nishimori et al. | |
| 2014/0254130 | A1 | 9/2014 | Mehl | |
| 2015/0002824 | A1* | 1/2015 | Kasugai | G03B 21/204 353/31 |
| 2015/0124223 | A1* | 5/2015 | Yamauchi | G03B 21/2093 353/20 |

FOREIGN PATENT DOCUMENTS

| | | |
|---|---|---|
| JP | 2012-215633 A | 11/2012 |
| JP | 2013-011652 A | 1/2013 |
| JP | 2013-073080 A | 4/2013 |
| JP | 2013-073081 A | 4/2013 |
| JP | 2014-053285 A | 3/2014 |

* cited by examiner

Front View of Laser Diode

Explanatory Diagram of Axis

Front View of Laser Diode

Explanatory Diagram of Axis

Front View of Laser Diode

Explanatory Diagram of Axis

Light-Incident Surface Side

Light-Emission Surface Side

Collimate Lens Focusing Position

Collimate Lens Shifted From Focusing Position

Condensed Shape and Light Intensity Distribution (Sectional View)

Condensed Shape     Sectional Light Intensity

Condensed Shape and Light Intensity Distribution (Sectional View)

Condensed Shape     Sectional Light Intensity

Individual
Collimate Lens

LIGHT SOURCE APPARATUS AND PROJECTOR HAVING LIGHT SOURCE APPARATUS

CROSS-REFERENCE TO RELATED APPLICATIONS

The present application claims priority under 35 U.S.C. §119 to Japanese Patent Application No. 2014-253323, filed on Dec. 15, 2014. The contents of this application is incorporated herein by reference in their entirety.

BACKGROUND

Field

The disclosure relates to a light source apparatus and a projector having the light source apparatus.

Description of the Related Art

Recently, a time divisional type projector has become popular. The time divisional type projector emits lights of a plurality of wavelengths and forms images by modulating the emitted lights of the plurality of wavelengths sequentially, and then projects the formed images. As a light source apparatus used for the time divisional type projector, for example, there is known a light source apparatus having a light source that outputs a white light, and a rotating wheel to which a plurality of color filters are attached. According to such light source apparatus, the light source emits the white light to the rotating wheel which rotates at constant speed, and thereby emitting lights of a plurality of wavelengths (such as blue, green and red lights) in a time divisional manner.

Further, there is also proposed a light source apparatus including a light source that outputs a light of a single wavelength, such as a laser diode, and a rotating wheel having phosphor layers instead of color filters. According to such light source apparatus, the light source emits the light of a single wavelength to the rotating wheel which rotates at constant speed, and thereby emitting lights of a plurality of wavelengths in a time divisional manner. For example, it is possible to convert wavelength of a blue light from a laser diode into that of a green or red light by using phosphors.

In such light source apparatus, as described in JP 2013-73081 or JP 2012-215633, there is proposed a method to change a location of the light condensed position of each laser diode on the phosphor by varying a distance between the plurality of laser diodes and a distance between collimating lenses located at the output side of the laser light sources, and thereby exciting the phosphors with a low light density.

According to the light source apparatus described in JP 2013-73081 A, JP2012-215633, since the location of the light condensed position of each laser light source is different, the location of the light condensed position can be changed. However, since a diameter of the condensed shape of the parallel light emitted from the collimating lens is small, the light intensity at the light condensed position is so high that the emission efficiency of phosphor is reduced. Further, since a beam shape at the light condensed position of the condenser lens is determined according to a far field pattern or a near field pattern of the laser diode, it is difficult to obtain a beam shape with a desired size or a desired aspect ratio.

SUMMARY

One aspect of the light source apparatus according to the present invention is a light source apparatus, comprising: a plurality of light sources each including a laser diode and a collimating lens which corresponds to the laser diode. A condenser lens condenses lights emitted from said light sources. A phosphor wheel having a phosphor is included, with the, phosphor wheel transmitting a light which is emitted from said condenser lens. At least in a part of the plurality of light sources, the collimating lens and the laser diode are placed with a first shift such that an optical axis of the collimating lens is shifted from an optical axis of a light emitted from the laser diode in the direction perpendicular to the optical axis of the emitted light. The laser diodes include a first laser diode in which a direction of a short axis of a condensed shape thereof is placed in a first direction, and a second laser diode in which a direction of a short axis of a condensed shape thereof is placed in a second direction which is different from the first direction. The collimating lens which corresponds to the first laser diode and the collimating lens which corresponds to said second laser diode are placed with a second shift in a direction of the optical axis of the collimating lens.

Another aspect of the light source apparatus according to the present invention is a light source apparatus comprising a plurality of light sources each including a laser diode and a collimating lens which corresponds to the laser diode. A condenser lens condenses lights emitted from said light sources, and a phosphor wheel having a phosphor is included, with the, phosphor wheel transmitting a light which is emitted from the condenser lens. At least in a part of the plurality of light sources, the collimating lens and the laser diode are placed with a first shift such that an optical axis of the collimating lens is shifted from an optical axis of a light emitted from the laser diode in the direction perpendicular to the optical axis of the emitted light. The laser diodes include a first laser diode in which a direction of a short axis of a condensed shape thereof is placed in a first direction, and a second laser diode in which a direction of a short axis of a condensed shape thereof is placed in a second direction which is different from the first direction. A focal length of the collimating lens which corresponds to the first laser diode is different from a focal length of the collimating lens which corresponds to the second laser diode.

One aspect of a projector according to embodiments of the present invention is a projector comprising the light source apparatus according to the above mentioned aspect, and a light modulating device which modulates lights emitted from the light source apparatus in the plurality of wavelength ranges to form an image based on an image data. A projecting device enlarges and projects the images.

BRIEF DESCRIPTION OF THE DRAWINGS

FIG. 1 B illustrates an explanatory diagram of the axis in FIG. 1A.

FIG. 1 D illustrates an explanatory diagram of the axis in FIG. 1C.

FIG. 3 B illustrates an explanatory diagram of the axis in FIG. 3A.

DESCRIPTION OF EMBODIMENTS

Figure 1A:
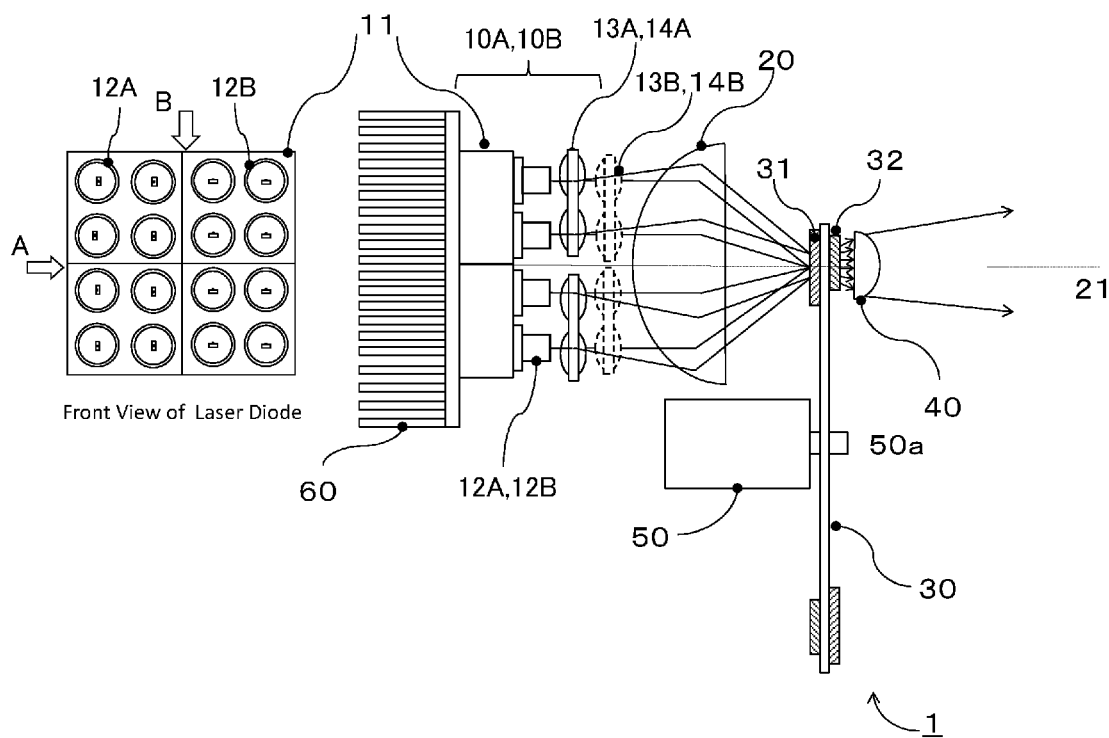
FIG. 1 A illustrates a plan view which schematically describes a light source apparatus according to one embodiment of the present invention.
FIG. 1C illustrates a side view which schematically describes a light source apparatus according to one embodiment of the present invention.
Figure 1B:
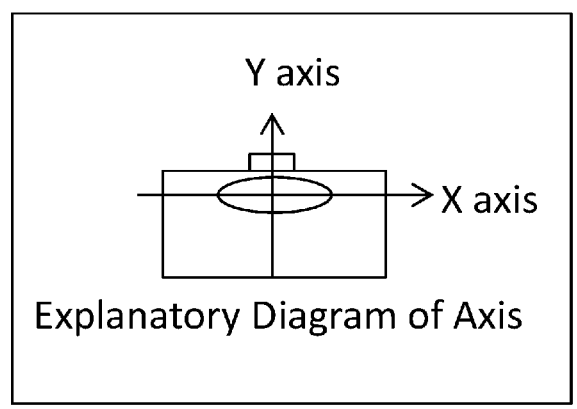
Figure 1C:
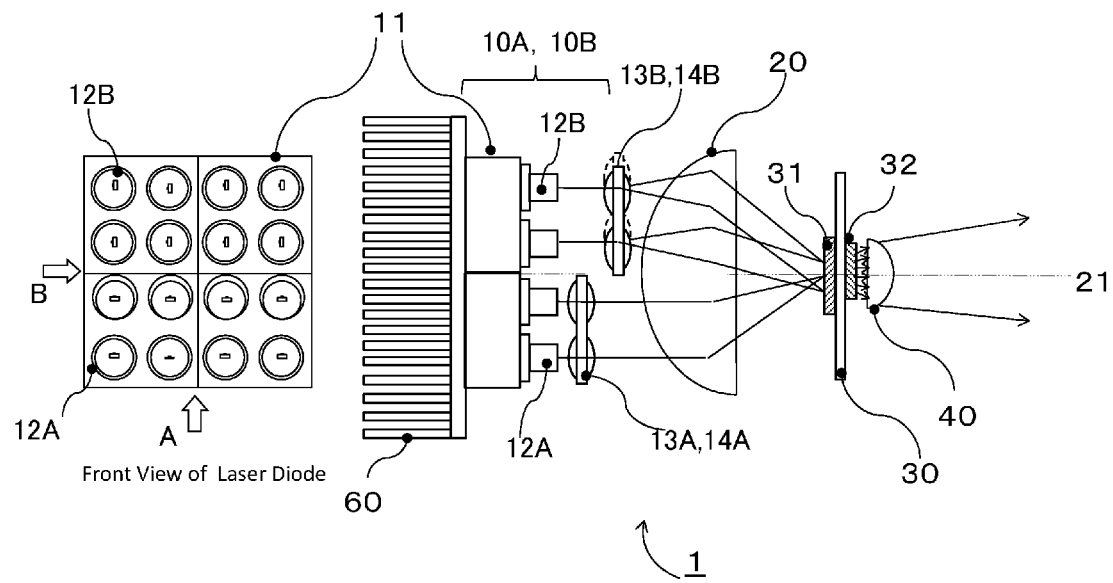
Figure 1D:
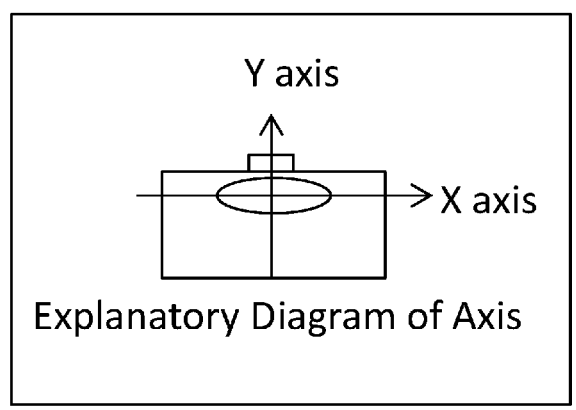

Referring to FIGS. 1 to 1D, a light source apparatus according to one embodiment of the present invention is described. FIG. 1 A illustrates a plan view which schematically describes a light source apparatus according to one embodiment of the present invention. FIG. 1 A also illustrates a figure to see laser diodes 12A, 12B of the light source 10 from condenser lens 20 side as a front view of the laser diode in the left part of FIG. 1A as well as the plan view of the laser diodes. FIG. 1B illustrates an axis explanatory diagram which defines the axis to explain a far field pattern and a short field pattern of the laser beam emitted from the laser diode. FIG. 1 C illustrates a side view which schematically describes the light source apparatus according to one embodiment of the present invention. FIG. 1 C also illustrates a figure to see laser diodes 12A, 12B of the light source 10 from condenser lens 20 side as a front view of the laser diode in the left part of FIG. 1C as well as the side view of the laser diodes. FIG. 1D illustrates an axis explanatory diagram which defines the axis to explain a far field pattern and a short field pattern of the laser beam emitted from the laser diode. In the front view of the light source according to this embodiment, the light source apparatus seen from the arrow A corresponds to the plan view of the light source apparatus according to this embodiment, and the light source apparatus seen from the arrow B corresponds to the side view of the light source apparatus according to this embodiment.

At first, an outline of the light source apparatus according to this embodiment is explained with referring to FIG. 1A and FIG. 1B. As illustrated in FIG. 1A, the light source apparatus 1 according to this embodiment includes light sources 10 (in detail, 10A,10B), a condenser lens 20, a phosphor wheel 30, a receiving lens 40, a rotary driving apparatus 50 and a heat dissipation plate 60.

In this embodiment, blue lights are emitted from the light sources 10, and the emitted blue lights enter the condenser lens 20. The lights are condensed by the condenser lens 20, and then enter the phosphor wheel 30 which is rotated by the rotary driving apparatus 50. The phosphor wheel 30 is formed by a material which transmits a light. A dielectric film 31 is formed on a light-incident surface of the phosphor wheel 30 concentrically, and a phosphor 32 is formed on light-emitting surface of the phosphor wheel 30 concentrically. In more detail, a green phosphor region, a red phosphor region and a blue-light transmissive region are formed on the light-emission surface of the phosphor wheel 30 concentrically. The green phosphor emits a green light when a blue light enters the green phosphor, and the red phosphor emits a red light when a blue light enters the red phosphor. Therefore, when a blue light from the condenser lens 20 enters the phosphor wheel 30, a green light, a red light and a blue light is emitted from the phosphor wheel 30 in a time divisional manner, and enter the receiving lens 40. Then, the light is condensed by the receiving lens 40, and is outputted from the light source apparatus 1. Actually, a light can be emitted from the receiving lens 40 with spreading, in parallel or with being condensed.

A wavelength of the emitted lights of the laser diodes 12 used in this embodiment is preferably in a range from 370 to 500 nm, and more preferably from 420 to 500 nm.

Further, the light source apparatus 10 is explained in more detail. Four of the light sources 10 are fixed to a mounting surface of the heat dissipation plate 60 which is a supporting member. In the front view of the laser diode shown in the left part of the drawing, the light source includes two of the first light sources 10A which is placed such that the long axis of the near field pattern of the laser diode (X axis in FIG. 1B) is in the vertical direction in the drawing, and two of the second light sources 10B which is placed such that the long axis of the near field pattern of the laser diode is in the horizontal direction in the drawing. As described below, in this embodiment, since the lens arrays 14A, 14B are placed with a shift from the focusing position to emit a parallel light, a direction of the short axis in the condensed shape which is a beam shape at the light condensed position corresponds to the direction of long axis of the near field pattern (that is, direction of the short axis of the far field pattern). Therefore, it can be said that the first light source 10A is placed such that the direction of the short axis of the condensed shape is in the vertical direction in the drawing, and such direction can be described as "a first direction". Similarly, it can be said that the second light source 10B is placed such that the direction of the short axis of the condensed shape (in the front view of the laser diode) is in the horizontal direction in the drawing, and such direction can be described as "a second direction"

Each of first light sources 10A has a housing 11, four of first laser diodes 12A to emit a blue light, which are provided in the housing 11, a first lens array 14A (shown in a solid line) which is formed by four of first collimating lenses 13A corresponding to the first laser diodes 12A respectively.

Similarly, each of second light sources 10B has a housing 11, four of second laser diodes 12B to emit a blue light, which are provided in the housing 11, a second lens array 14B (shown in a dotted line) which is formed by four of second collimating lenses 13B corresponding to the second laser diodes 12B respectively. Relating to the housing 11, while the four housings are used in the embodiment, it is possible to use one common housing.

In the first light source 10A, the first lens array 14A and the laser diodes 12A are placed with the first shift such that an optical axis of the first collimating lens 13A which forms the first lens array 14A is shifted from an optical axis of a light emitted from the laser diode 12A which corresponds to the first collimating lens 13A in the direction perpendicular to the optical axis of the emitted light (in the vertical direction in FIG. 1A). Similarly, in the second light source 10B, the second lens array 14B and the laser diodes 12B are placed with the first shift such that an optical axis of the second collimating lens 13B which forms the second lens array 14B is shifted from an optical axis of a light emitted from the laser diode 12B which corresponds to the second collimating lens 13B in the direction perpendicular to the optical axis of the emitted light (in the horizontal direction in the front view of the laser diode of FIG. 1A, the vertical direction in FIG. 1C).

Further, the lens array 14A of the first light source 10A (shown in the solid line) and the second lens array 14B of the second light source 10B (shown in the dotted line) are placed with the second shift in the direction of the optical axis of the collimating lenses 13A, 13B. Further explanation relating to the first shift and the second shift will be described later.

In FIGS. 1A and 1C, while it is illustrated such that the light is condensed onto a surface of the dielectric film 31 formed on the light-incident surface of the phosphor wheel 30, it is possible to describe the light is condensed onto different positions on the phosphor 32" because the dielectric film 31 is very thin and the light is not condensed nor diffused on the phosphor wheel 30.

Figure 4A:
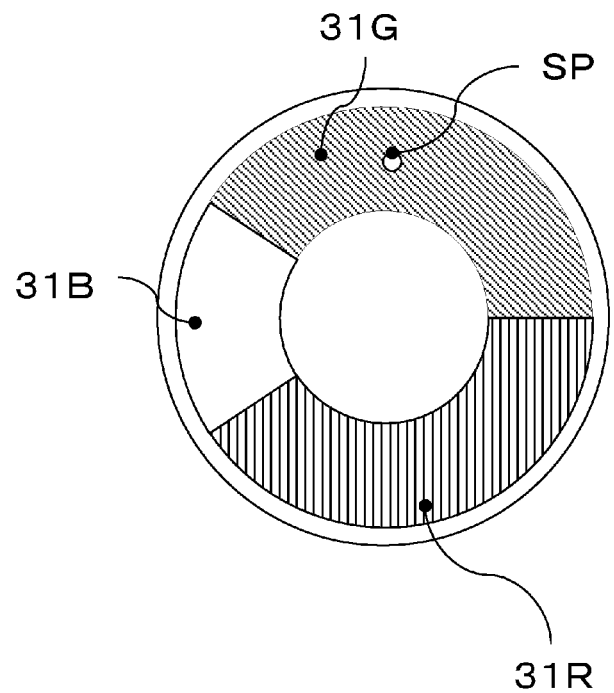
FIG. 4A illustrates a schematic diagram for describing a light-incident surface side of a phosphor wheel according to one embodiment of the present invention.
Figure 4B:
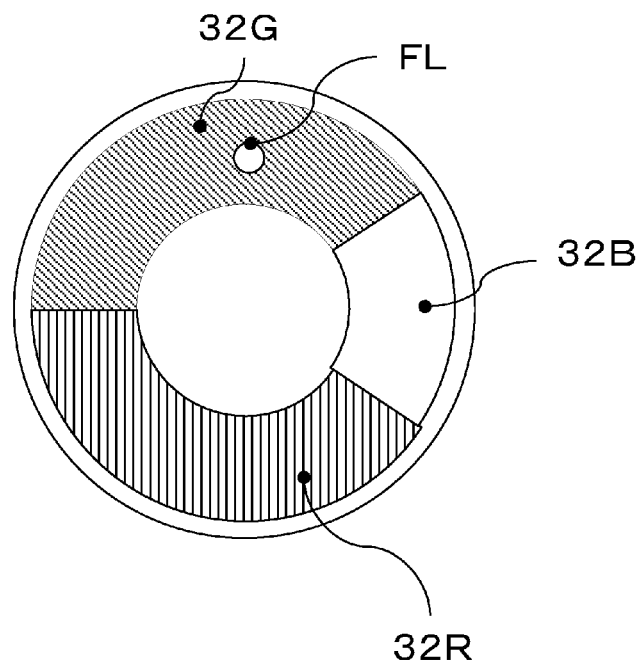
FIG. 4B illustrates a schematic diagram for describing a light-emission surface side of a phosphor wheel according to one embodiment of the present invention.

As mentioned above, the dielectric film 31 is formed on the light-incident surface of the phosphor wheel 30, and the phosphor 32 is formed on the light-emission surface of the phosphor wheel 30 concentrically with the phosphor wheel 30. In FIGS. 4A and 4B, a phosphor wheel according to one embodiment is illustrated schematically. FIG. 4 A illustrates the light-incident surface of the phosphor wheel 30 and FIG. 4 B illustrates the light-emission surface of the phosphor wheel 30. The green phosphor region, the red phosphor region and the blue-light transmissive region are formed on the phosphor wheel 30. In the green phosphor region, the dielectric film 31G which transmits a blue light and reflects a green light is formed on the light-incident surface side. A green phosphor 32G which has a green light wavelength range is formed on the light-emission surface side. Similarly, in the red phosphor region, the dielectric film 31R which transmits a blue light and reflects a red light is formed on the light-incident surface side, and a red phosphor 32R which has a red light wavelength range is formed on the light-emission surface side. In the blue-light transmissive region, the dielectric film 31B which transmits a blue light is formed on the light-incident surface side, and no phosphor is formed on the light emission surface side. However, the dielectric film 31B which transmits a blue light may be formed on the light-emission surface side as well as on the incident surface side. A light-scattering member such as a particle of $SiO_2$, $TiO_2$, $Ba_2So_4$ or the like is preferably formed thereon in order to improve luminance unevenness and color unevenness.

The dielectric films 31G and 31R formed on the green phosphor region and red phosphor region respectively transmit a blue light and reflects a light of the wavelength corresponding to the color of respective region. Accordingly, a light emitted from the phosphors 32G and 32R in the direction toward the laser diode 12 can be reflected back toward the receiving lens 30 by the dielectric films 31 G and 31R, so that the phosphor can be used efficiently.

The phosphor 32G which is coated on the green phosphor region of the phosphor wheel 30 preferably emits a green light including the wavelength range of 500 to 560 nm. Specific examples of the materials of the phosphor 32G are $\beta\text{-Si}_{6-z}$: $Al_zO_zN_{8-z}$: Eu, $Lu_3Al_5O_{12}$: Ce, $Ca_8MgSi_4O_{16}C_{12}$: Eu, $Ba_3Si_6O_{12}N_2$: Eu, $(Sr, Ba, Ca)Si_2O_2N_2$: Eu.

The phosphor 32R which is coated on the red phosphor region of the phosphor wheel 30 preferably emits a red light including the wavelength range of 600 to 800 nm. Specific examples of the materials of the phosphor 32R are $(Sr, Ca)AlSiN_3$: Eu, $CaAlSiN_3$: Eu, $SrAlSiN_3$: Eu, $K_2SiN_6$: Mn.

The ratio among the green phosphor region, the red phosphor region and the blue-light transmissive region on the phosphor wheel 30 can appropriately be determined. For example, the ratio can be calculated according to the chromaticity of a white light required for a projector and the efficiency of each phosphor or the like. In this embodiment, each of the green phosphor and the red phosphor region has an angle of 150 degrees, and the blue-light transmissive region has an angle of 60 degrees.

While the phosphor wheel 30 has three regions which are for green, red and blue lights, it can have four regions or more. For example, a white light region with blue and yellow light may be further provided. The number of regions for green, red and blue lights can be increased respectively and 2 positions for each color.

The phosphor wheel 30 is made of a transparent circular plate which transmits a light, and a center of the phosphor wheel 30 is fixed to the rotating axis 50a of the rotary driving apparatus 50. As a material of the phosphor wheel 30, any material having a high light-transmittance, such as glass, resin, sapphire or the like can be used. In FIG. 4A, a position indicated by "SP" shows the position to which a light emitted from the housing 10 is condensed by the condenser lens 20 (the light condensed position). In FIG. 4B, the position indicated by "FL" shows the position in which the phosphor layer emits when a light is projected from the light source 10 (the phosphor position).

Further, it is also possible to add one more plate at the light-emission surface side and provide a band pass filter thereon. Accordingly, a purer green or red color can be obtained.

Returning to the description of FIGS. 1A and 1C, the rotary driving apparatus 50 is a brushless DC motor, and placed such that the rotating axis 50a thereof and the optical axis 21a of the condenser lens 20 are located in parallel. Further, the rotary driving apparatus 50 is fixed such that the surface of the phosphor wheel 30 is located perpendicularly to the rotating axis 50a. A rotating speed of the rotary driving apparatus 50 is a rotating speed according to a frame rate of moving images (the number of frames per second, a unit [fps]) to be played. For example, in the case where moving images are played at 60 [fps], a rotating speed of the rotary driving apparatus 50 (that is, the phosphor wheel 30) should be determined as integer multiples of 60 rounds per second.

A light which is emitted from the phosphor wheel 30 is condensed by the receiving lens 40 and is outputted from the light source apparatus 1. In the case where the light source apparatus is used for a light source for the projector, a light outputted by the light source apparatus 1 is condensed onto a light modulating device, and the image formed by the light modulating device is enlarged and projected by a projecting device. An etendue which is calculated according to the relationship between the image size formed by the light modulating device and the projecting angle of the light projected by the projecting device is affected by "NA" of the receiving lens 40 and the size of emitting area of the phosphor.

Thus, the following formula is given:

(Size of image formed by Light modulating device)×(Projecting angle)=(Phosphor position FL)×(NA of Receiving lens)

Accordingly, since the phosphor emits a light in approximately Lambertian distribution, it is desirable that the light-receiving lens 40 should have higher NA, and the phosphor position FL should be small. If the etendue of the phosphor side is higher than the etendue of the projecting device side, the difference causes reduction of the efficiency.

As mentioned above, since the light-receiving lens 40 has high NA, it is desirable that the phosphor position FL should be as small as possible. In this case, however, a light density of a light from light source 10 may become high. In this embodiment, since it is preferable that the size of the phosphor position FL is preferably around 2 mm, it is preferable that the size of the light condensed position SP should be 2 mm or less. This size is not a size of the light condensed position of a light from each light source 10, but total area of the light condensed positions on the condition that the plurality of light sources 10 are fixed.

Next, the light source according to the present invention, especially the light source according to one embodiment or another embodiment of the present invention will be described.

Figure 2:
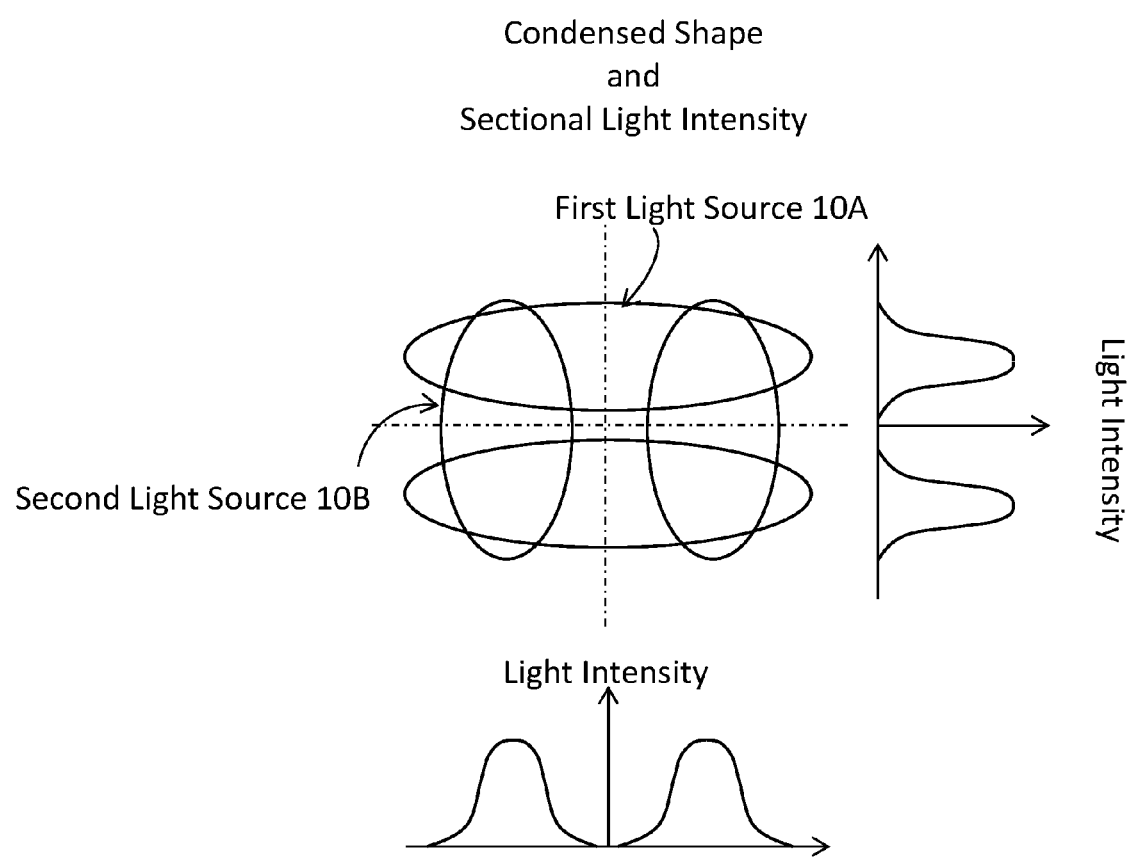
FIG. 2 illustrates a figure for describing a shape and a light intensity distribution (sectional light intensity) of the light condensed position in the embodiment of the present invention.

Referring to FIGS. 1A, 1C and 2, the light source according to one embodiment of the present invention is described.

As mentioned above, four of the first laser diodes 12A in which the direction of the short axis of the condensed shape thereof is the first direction (the vertical direction in FIG. 1A), and the first lens array 14A which is formed by four of the first collimating lenses 13A corresponding to each of the first laser diode 12A (shown in the solid line) are installed onto the housing 11. Two of the first light sources 10A are connected to the heat dissipation plate 60 with contacting each other (contacting at the side surface). Similarly, four of the second laser diodes 12B in which the direction of the short axis of the condensed shape thereof is the second direction (the horizontal direction in the front view of the laser diode of in FIG. 1A, the vertical direction in FIG. 1C) and the second lens array 14B which is formed by four of the second collimating lenses 13B corresponding to each of the second laser diode 12B (shown in the dotted line) are installed onto the housing 11. Two of the second light sources 10B are connected to the heat dissipation plate 60 with contacting each other (contacting at the side surface). Thus, two of the first light sources 10A and two of the second light sources 10B are connected to the heat dissipation plate 60 with contacting one another (contacting at the side surface).

Accordingly, it is possible to contribute to a longer operating life of the light source apparatus according to heat dissipation with using a larger plane of the heat dissipation plate 60 to dissipate the heat generated by the light source 10.

Further, since the supporting member is the heat dissipation member 60, the light source 10 can be cooled efficiently, and downsizing of the light source apparatus with reducing the number of components can be facilitated.

While the first direction and the second direction are shown in the vertical direction and the horizontal direction in FIGS. 1A and 1C, any other directions can be applied. While the first direction and the second direction are different by 90 degrees in this embodiment, it is not limited thereto, and any other angle can be applied.

As mentioned above, the "condensed shape" is a beam shape at the light condensed position. If the lens array 14A, 14B are placed at the focusing position where a parallel light is emitted from the collimating lens, the direction of the short axis of the consented shape corresponds to the direction of the short axis of near field pattern of the laser diode (Y axis in the drawings) and the direction of the long axis of the consented shape corresponds to the direction of the long axis of the near field pattern of the laser diode (X axis in the drawings). On the contrary, if the lens array 14A, 14B are placed at the defocusing position which is shifted from the focusing position where a parallel light is emitted from the collimating lens, the direction of the short axis of the consented shape corresponds to the direction of the short axis of far field pattern (that is the long axis of the near field pattern) of the laser diode and the direction of the long axis of the consented shape corresponds to the direction of the long axis of the far field pattern (that is the short axis of the near field pattern) of the laser diode.

In the first light source 10A as illustrated in FIG. 1A, the first lens array 14A and the first laser diode 12A are placed with the first shift such that an optical axis of the first collimating lens 13A which forms the first lens array 14A is shifted from an optical axis of a light emitted from the first laser diode 12A which corresponds to the first collimating lens 13A in the direction perpendicular to the optical axis of the emitted light (in the vertical direction in the drawing). Thus, the first shift is made in the direction of the short axis of the condensed shape of the first laser diode 12A.

Accordingly, as shown in the plan view in the middle part of FIG. 1A, a light emitted from the first light source 10A is directed not in parallel to the optical axis 21 of the condenser lens 20 but with a predetermined angle (for example, 0.25 to 2 degrees) thereto and enters the condenser lens 20. Therefore, lights are condensed onto different positions on the phosphor wheel 30 (thus, on the phosphor) respectively. The optical axes of the first collimating lenses 13A which form the first lens array 14A of two of the first light sources 10A are shifted outwardly with the same shifting amount to the optical axis of the first laser diodes 12A which correspond to the first collimating lenses 13A respectively. Thus, in two of the first light sources 10A, the direction of the first shift is different by 180 degrees. In other words, in two of the first light sources 10A, the first shift is made such as being symmetric with respect to the optical axis 21 of the condenser lens 20.

FIG. 2 illustrates an example of the condensed shape in the case that a light emitted from the first light source 10A which is placed with the first shift is condensed onto the phosphor wheel 30 by the condenser lens 20. Two condensed shapes having oval shapes with horizontal longer axes are formed at the upper and lower positions in FIG. 2. Accordingly, as shown in the graph in the right side of FIG. 2, the light emitted from the first light source 10A is distributed into the optical intensity curve having two peaks, without condensed into one position.

In FIG. 1A, while the optical axes of the first collimating lenses 13A are shifted outwardly to the optical axis of the corresponding first laser diodes 12A respectively, it is not limited thereto, and the optical axes of the first collimating lenses 13A can be shifted inwardly to the optical axis of the corresponding first laser diodes 12A respectively. Further, it is not limited to the case that two first light sources 10A are shifted with the same shifting amount, and each of the first light sources 10A can be shifted with different shifting amount respectively.

Next, the light source apparatus 1 is described with referring to FIG. 1C which shows the side surface of the light source apparatus seeing from the arrow B in the front view of the laser diode. In the second light source 10B shown in the upper part of the drawing, the second lens array 14B and the second laser diode 12B are placed with the first shift such that an optical axis of the second collimating lens 13B which forms the second lens array 14B is shifted from an optical axis of a light emitted from the second laser diode 12B which corresponds to the second collimating lens 13A in the direction perpendicular to the optical axis of the emitted light (in the vertical direction in the drawing). Thus, the first shift is made in the direction of the short axis of the condensed shape of the second laser diode 12B.

Accordingly, as shown in the side view in the middle part of FIG. 1C, a light emitted from the second light source 10B is directed not in parallel to the optical axis 21 of the condenser lens 20 but with a predetermined angle (for example, 0.25 to 2 degrees) thereto and enters the condenser lens 20. Therefore, lights are condensed onto different positions on the phosphor wheel 30 (thus on the phosphor) respectively. The optical axes of the second collimating lenses 13B which form the second lens array 14B of two of the second light sources 10B are shifted upwardly and downwardly with the same shifting amount to the optical axis of the second laser diodes 12B which correspond to the second collimating lenses 13B respectively. Thus, in two of the second light sources 10B, the direction of the first shift is different by 180 degrees.

FIG. 2 illustrates an example of the condensed shape in the case that a light emitted from the second light source 10B which is placed with the first shift is condensed onto the phosphor wheel 30 by the condenser lens 20. Two condensed shapes having oval shapes with vertical longer axes are formed at the right and left positions in FIG. 2. Accordingly, as shown in the graph in the lower side of FIG. 2, the light emitted from the second light source 10B is distributed into the optical intensity curve having two peaks, without condensed into one position.

If the original peak optical intensity in the case of having only one condensed position is $P_0$, the peak light intensity P in FIG. 2 can be calculated by $P=P_0/4$ (number of the light condensed position=4). Thus, since the peak light intensity becomes the value to be calculated such that the peak light intensity $P_0$ in the case of single condensed position is divided by the number of condensed positions, the value of the case of FIG. 2 becomes a quarter of the original peak light intensity.

A light enters the condensed lens 20 with a predetermined angle (slanted angle) to the optical axis of the condensed lens 20 from the collimating lens 13A, 13B by the first shift. As a preferable angle, 0.25 to 2 degrees as absolute values are exemplified. If a slanted angle is in the range from 0.25 to 2 degrees as absolute values, the area of the light condensed position SP (refer to FIG. 4A) is not so large on the phosphor wheel 30. In one embodiment as shown in FIGS. 1A and 1C, it is not limited to the shift with the same shifting amount. The first shift can be made with different shifting amount according to the lens array 14A, 14B respectively.

In this embodiment, as illustrated in FIG. 1C, the lens array 14A of the first light source 10A which is located in the lower part of the drawing and the lens array 14B of the second light source 10B which is located in the upper part of the drawing are placed with a second shift in a direction of the optical axis of a collimating lens 13A, 13B. Both the lens array 14A of the first light source 10A and the lens array 14B of the second light source 10B are placed at the defocusing position which is closer to the laser diodes 12A, 12B than the focusing position where a light emitted from the laser diodes 14A, 14B becomes a parallel light. In comparison between the lens array 14A of the first light source 10A and the lens array 14B of the second light source 10B, the lens array 14A of the first light source 10A is placed farther from the focusing position (that is, more defocused) than the lens array 14B of the second light source 10B.

With referring to FIG. 2, the condensed shapes are compared when a light emitted from the first light source 10A and the second light source 10B both having the second shift is condensed onto the phosphor wheel 30 by the condenser lens 20. As illustrated in FIG. 2, the condensed shape having an oval shape with a horizontal longer axis is formed by the first light source 10A which is placed farther from the focusing position than the second light source 10B, and the condensed shape having an oval shape with a vertical longer axis is formed by the second light source 10B which is placed closer to the focusing position than the first light source 10B. A length of the horizontal longer axis of the oval shape formed by the first light source 10A which is positioned farther from the focusing position is longer than a length of the vertical longer axis of the oval shape formed by the second light source 10B. This is because the first light source 10A in which the collimating lens thereof is positioned farther from the focusing position can form a larger image at the light condensed position (that is, the condensed shape is made larger).

Accordingly, in this embodiment, it is possible to obtain a condensed shape (beam shape) with an aspect ratio whose horizontal length is longer (or whose vertical length is longer) on the phosphor wheel 30 which is the light condensed position by the condensed lens 20. Therefore, it is possible to obtain a condensed shape (beam shape) having any desired size and any desired aspect ratio by selecting the second shifting amount and the position of the collimating lens from the focusing position adequately. Since lights are consented onto different positions by the first shift, it is possible to adjust a size of the condensed shape (beam shape) accordingly. While a condensed shape (beam shape) having a dimension of 1.5 mm length×2 mm width can be exemplified as one example of the desired size and the desired aspect ratio, it is not limited thereto.

As mentioned above, the light source apparatus according to one embodiment of the present invention as illustrated in FIGS. 1A, 1C and 2 has the light source 10A, 10B having the plurality of laser diodes 12A, 12B and a lens array 14A, 14B formed by the plurality of collimating lenses 13A, 13B which correspond to the laser diodes 12A, 12B respectively. The light source 10A, 10B includes the first light source 10A in which a direction of the short axis of the condensed shape thereof is placed in the first direction and the second light source 10B in which a direction of a short axis of a condensed shape thereof is placed in the second direction which is different from the first direction. The light source apparatus also has a condenser lens 20 which condenses lights emitted from the first light source 10A and the second light source 10B, and the phosphor wheel 30 having a phosphor, which transmits a light which is emitted from the condenser lens 20. In the first light source 10A and the second light source 10B, the lens array 14A, 14B and the laser diode 12A. 12B are placed with the first shift such that an optical axis of the collimating lens 13A, 13B which forms the lens array 14A, 14B is shifted from an optical axis of a light emitted from the laser diode 12A, 12B which corresponds to the collimating lens 13A, 13B in the direction perpendicular to the optical axis of the emitted light. The lens array 14A of the first light source 10A and the lens array 14B of the second light source 10B are placed with the second shift in a direction of the optical axis of the collimating lens 13A, 13B.

Since the collimating lens 13A, 13B is placed with the first shift such that the optical axis of the collimating lens 13A, 13B which forms the lens array 14A, 14B is shifted from the optical axis of a light emitted from the laser diode 12A, 12B which corresponds to the collimating lens 13A, 13B in the direction perpendicular to the light emitted from the light source 10A, 10B, lights emitted from the plurality of light sources are condensed onto different positions on the phosphor wheel 30 (that is "on the phosphor") by the condenser lens 20. Therefore, a light intensity at the light condensed position on the phosphor can be lowered, so that a light which is emitted from the phosphor can be used efficiently.

Further, since the lens array 14A of the first light source 10A in which the direction of the short axis of the condensed shape thereof is placed in a first direction and the lens array 14B of the second light source 10B in which the direction of the short axis of the condensed shape thereof is placed in the second direction are placed with the second shift in the direction of the optical axis of the collimating lens 13A, 13B, it is possible to obtain a condensed shape (beam shape) with a desired size and a desired aspect ratio on the phosphor wheel 30 (thus, on the phosphor) which is the condensed position by the condenser lens 20.

As mentioned above, according to this embodiment, in the plurality of light sources 10A, 10B which utilize the laser diode 12A, 12B and the collimating lens 13A, 13B, it is possible to suppress degradation of the emission efficiency of phosphor, and further in the condensed position, it is possible to obtain the condensed shape (beam shape) with the desired size and the desired aspect ratio at the condensed position. Since the lights are condensed onto the different positions by the first shift, the size of the condensed shape (beam shape) can also be adjusted.

Further, since the light source at least includes two of the first light sources 10A in which the direction of the first shift is different by 180 degrees, and two of the second light sources 10B in which the direction of the first shift is different by 180 degrees, it is possible to obtain two condensed shapes (beam shapes) of the first light source 10A located at the symmetric positions with respect to the optical axis of the condensed lens 20, and two condensed shapes (beam shapes) of the second light source 10B located at the optical axis of the condensed lens 20. Accordingly, it is possible to obtain the condensed shape (beam shape) which spreads with a certain angle around the optical axis of the condenser lens 20.

Further the first shift is made in the direction of the short axis of the condensed shape of the laser diode 12A, 12B, a light emitted from each laser diode 12A, 12B does not interfere with each other, and it is possible to suppress increase of a light density adequately at the light condensed position.

Further, since the first direction and the second direction are different by 90 degrees, it is possible to obtain a condensed shape (beam shape) with a desired aspect ratio according by adjusting the second shift between the first lens array 14A and the second lens array 14B, or a distance from the focusing position.

While the first lens array 14A of the first light source 10A and the second lens array 14B of the second light source 10B are placed at the defocusing position which is located closer to the laser diode 12A, 12B than the focusing position in one embodiment as illustrated in FIG. 1A, 1C, the first lens array 14A and the second lens array 14B can adversely be positioned at the defocusing position which is located farther from the laser diode 12A, 12B than the focusing position. Further, the lens array which is positioned closer to the focusing position can be positioned at the focusing position. In this case, since the direction of the short axis of the condensed shape corresponds to the direction of the short axis of the near field pattern, not the far field pattern, it is necessary to turn the laser diode by 90 degrees before installation.

While the light source apparatus having four of the light sources is exemplified in this embodiment, it is not limited thereto, and any other light source apparatus having any number of light sources is included in the present invention. For example, it can have a plurality of pairs of light sources in which one light source without the first shift is placed at the optical axis of a condenser lens and another light source with the first shift is placed around the optical axis of a condenser lens. In the present invention, a light source can be placed at any position so that the short axis of the condensed shape thereof can have arbitrary direction.

Figure 6:
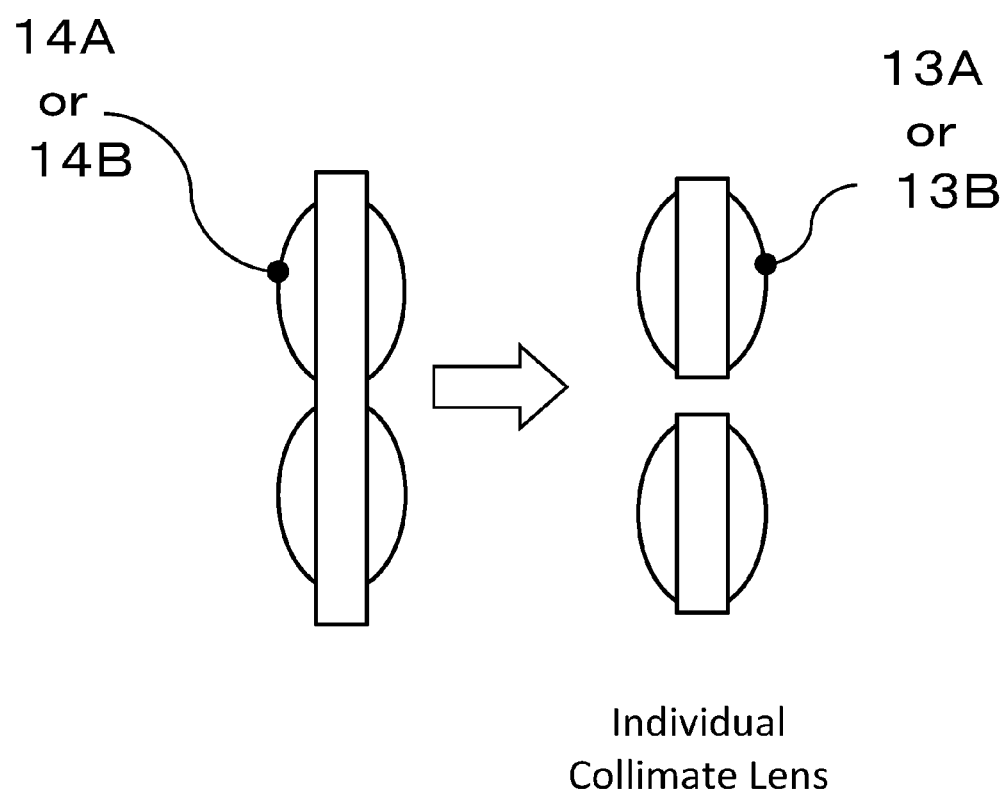
FIG. 6 illustrates a schematic diagram for describing an embodiment to use individual collimating lenses instead of a lens array.

While the lens array formed by a plurality of collimating lenses is described in the above mentioned embodiment, it is not limited thereto. As shown in the collimating lens of FIG. 6, individual collimating lenses 13A, 13B (the right part of FIG. 6) can be used instead of the lens array 14A, 14B (the left part of FIG. 6). In this case, individual collimating lenses 13A, 13B are placed in the housing instead of the lens array 14A, 14B. The other configuration is basically the same as the above mentioned one embodiment.

Thus, a light source apparatus 1 has a plurality of light sources 10A, 10B each including a laser diode 12 A, 12B and a collimating lens 13A, 13B which corresponds to the laser diode 12A, 12B, a condenser lens 20 which condenses lights emitted from the light sources 10A, 10B, and a phosphor wheel 30 having a phosphor. Such phosphor wheel 30 transmits a light which is emitted from the condenser lens 20. At least in a part of the plurality of light sources 10 A, 10B, the collimating lens 13A, 13B and the laser diode 12A, 12B are placed with a first shift such that an optical axis of the collimating lens 13A, 13B is shifted from an optical axis of a light emitted from the laser diode 12A, 12B in the direction perpendicular to the optical axis of the emitted light. The laser diodes 12A, 12B include a first laser diode 12A in which a direction of a short axis of a condensed shape thereof is placed in a first direction, and a second laser diode 12B in which a direction of a short axis of a condensed shape thereof is placed in a second direction which is different from the first direction. The collimating lens 13A which corresponds to the first laser diode 12A and the collimating lens 13B which corresponds to the second laser diode 12B are placed with a second shift in a direction of the optical axis of the collimating lens 13A, 13B.

According to this embodiment, since the collimating lens 13A, 13B is placed with the first shift such that the optical axis of the collimating lens 13A, 13B is shifted from the optical axis of the light emitted from the corresponding laser diode 12A, 12B in the direction perpendicular to the optical axis of the emitted light, lights emitted from the plurality of light sources are condensed onto different positions on the phosphor wheel 30 (that is "on the phosphor") by the condenser lens 20. Therefore, a light intensity at the light condensed position on the phosphor can be lowered, so that a light which is emitted from the phosphor can be used efficiently.

Further, since the collimating lens 13A which corresponds to the first laser diode 12A in which the direction of the short axis of the condensed shape thereof is the first direction and the collimating lens 13B which corresponds to the second laser diode 12B in which the direction of the short axis of the condensed shape thereof is the second direction are placed with the second shift in a direction of the optical axis of the collimating lens 13A. 13B, a size of the condensed shape (beam shape) is different, and it is possible to obtain a condensed shape (beam shape) with a desired size and a desired aspect ratio on the phosphor wheel 30 (thus, on the phosphor) which is the condensed position by the condenser lens 20.

As mentioned above, according to this embodiment, in the plurality of light sources 10A, 10B which utilize the laser diode 12A, 12B and the collimating lens 13A, 13B, it is possible to suppress degradation of the emission efficiency of phosphor, and further in the condensed position, it is possible to obtain the condensed shape (beam shape) with the desired aspect ratio at the condensed position. Since the lights are condensed onto the different positions by the first shift, the size of the condensed shape (beam shape) can also be adjusted.

According to this embodiment, in the pair of individual laser diode 12A, 12B and individual collimating lens 13A, 13B, since the first shift and the second shift with a different shifting amount or a different shifting direction can be made, more detailed adjustment can be achieved.

Figure 3A:
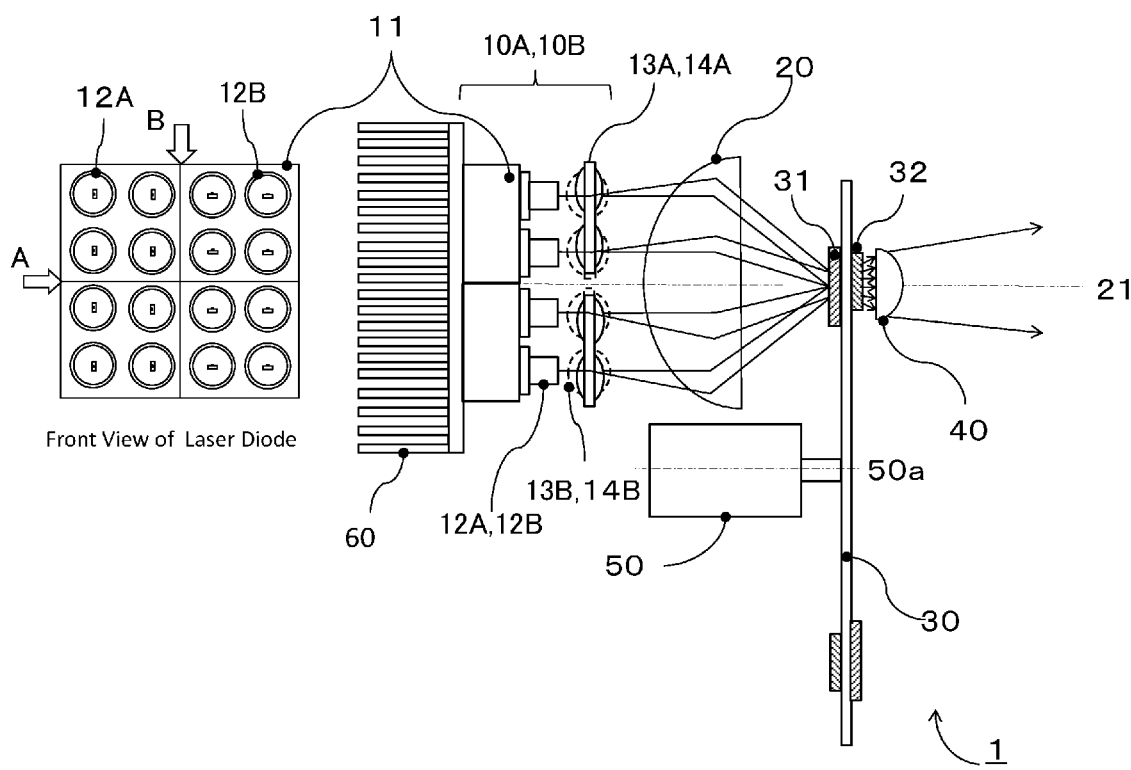
FIG. 3 A illustrates a plan view which schematically describes a light source apparatus according to another embodiment of the present invention.
FIG. 3C illustrates a side view which schematically describes a light source apparatus according to another embodiment of the present invention.
FIG. 3D illustrates an explanatory diagram of the axis in FIG. 3C.
Figure 3B:
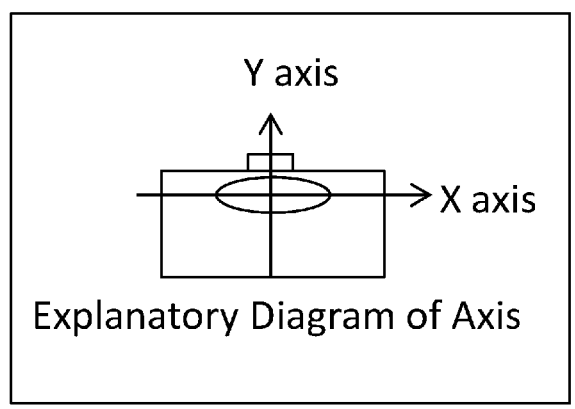
Figure 3C:
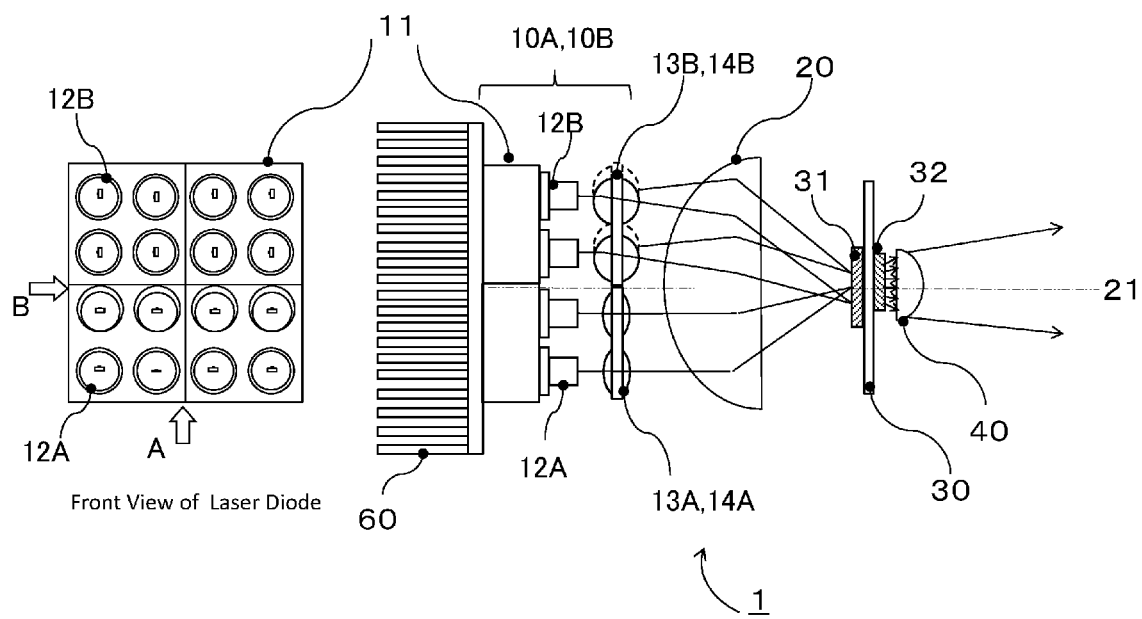
Figure 3D:
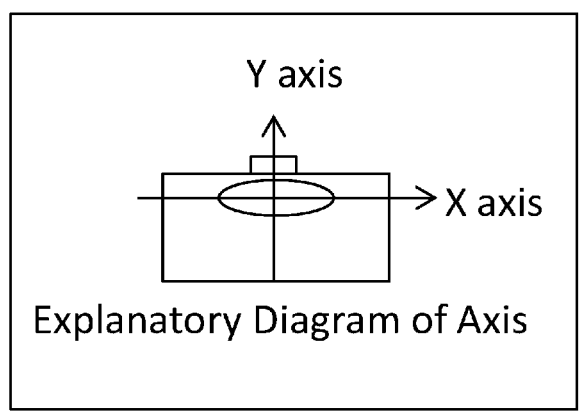

Next, another embodiment of the present invention relating to the light source is described with referring to FIGS. 3A to 3D and FIG. 2. FIG. 3 A illustrates a plan view which schematically describes a light source apparatus according to another embodiment of the present invention. FIG. 3 A also illustrates a figure to see laser diodes 12A, 12B of the light source 10 from condenser lens 20 side in the left part of FIG. 3A as well as the plan view of the laser diodes. FIG. 3B illustrates an axis explanatory diagram which defines the axis to explain a far field pattern and a short field pattern of the laser beam emitted from the laser diode. FIG. 3 C illustrates a side view which schematically describes the light source apparatus according to another embodiment of the present invention. FIG. 3 C also illustrates a figure to see laser diodes 12A, 12B of the light source 10 from condenser lens 20 side in the left part of FIG. 3C as well as the side view of the laser diodes. FIG. 3D illustrates an axis explanatory diagram which defines the axis to explain a far field pattern and a short field pattern of the laser beam emitted from the laser diode. In the front view of the light source apparatus according to this embodiment, the light source apparatus seen from the arrow A corresponds to the plan view of the light source apparatus according to this embodiment, and the light source apparatus seen from the arrow B corresponds to the side view of the light source apparatus according to this embodiment.

In this embodiment, a lens array and a laser diode are placed with a first shift such that an optical axis of an collimating lens which forms the lens array is shifted from an optical axis of a light emitted from the laser diode which corresponds to the collimating lens in the direction perpendicular to the optical axis of the emitted light. In one embodiment as mentioned above, the condensed shape (beam shape) with the desired size and the desired aspect ratio is obtained by placing the first lens array of the first light source and the second lens array of the second light source with the second shift in the direction of the optical axis of the collimating lens. In this embodiment, however, a condensed shape (beam shape) with a desired size and a desired aspect ratio is obtained by making different a focal length of the first collimating lens which corresponds to the first laser diode and a focal length of the second collimating lens which corresponds to the second laser diode 12B. In the embodiment as illustrated in FIG. 3A, 3C, while the second shift is not performed, both the first collimating lens 13A and the second collimating lens 13B are placed at the defocusing position which is shifted from the focusing position. While the second shift is not performed in this embodiment, the second shift can also be performed in combination with making different the focal length of the collimating lens.

Since the first shift according to another embodiment as illustrated in FIGS. 3A, 3C is similar to the first shift in one embodiment as illustrated in FIGS. 1A, 1C, the first shift according this embodiment will be described briefly.

A light source apparatus 1 according to this embodiment has a light source 10A, 10B having a plurality of laser diodes 12A, 12B and a lens array 14A, 14B formed by a plurality of collimating lenses 13A, 13B. The light source 10A, 10B includes a first light source 10A in which a direction of a short axis of a condensed shape thereof is placed in a first direction and a second light source 10B in which a direction of a short axis of a condensed shape thereof is placed in a second direction which is different from the first direction. The light source apparatus 1 also has a condenser lens 20 which condenses lights emitted from the first light source 10A and the second light source 10B, and the phosphor wheel 30 having a phosphor, which transmits a light which is emitted from the condenser lens 20. In the first light source 10A and the second light source 10B, the lens array 14A, 14B and the laser diode 12A. 12B are placed with the first shift such that an optical axis of the collimating lens 13A, 13B which forms the lens array 14A, 14B is shifted from an optical axis of a light emitted from the laser diode 12A, 12B which corresponds to the collimating lens 13A, 13B in the direction perpendicular to the optical axis of the emitted light.

Accordingly, two condensed shapes having oval shapes with horizontal longer axes are formed at the upper and lower positions on the phosphor wheel 30 which is a light condensed position according to the light emitted from the first light source 10A (refer to FIG. 2). On the contrary, two condensed shapes having oval shapes with vertical longer axes are formed at the at the right and left positions on the phosphor wheel 30 which is a light condensed position according to the light emitted from the first light source 10A (refer to FIG. 2).

Therefore, since there is performed the first shift such that the optical axis of the collimating lens 13A, 13B which forms the lens array 14A, 14B is shifted from the optical axis of the lights emitted from the laser diode 12a, 12b which corresponds to the collimating lens 13A, 13B in the direction perpendicular to the optical axis of the emitted light, lights emitted from the plurality of light sources 10A, 10B are condensed onto different positions on the phosphor wheel 30 (that is "on the phosphor") by the condenser lens 20. Therefore, a light intensity at the light condensed position on the phosphor can be lowered, so that a light which is emitted from the phosphor can be used efficiently.

FIG. 2 illustrates an example of the condensed shape in the case that a light emitted from the first light source 10A (the second light source 10B) which is placed with the first shift is condensed onto the phosphor wheel 30 by the condenser lens 20. In FIG. 2, two condensed shapes having oval shapes with horizontal (vertical) longer axes are formed at the upper and lower (right or left) positions. Accordingly, as shown in the graph in the right (lower) side of FIG. 2, the light emitted from the first light source 10A is distributed into the optical intensity curve having two peaks, without condensed into one position.

If the original peak optical intensity in the case of having only one condensed position is $P_0$, the peak light intensity P in FIG. 2 can be calculated by $P=P_0/4$ (number of the light condensed position=4). Thus, since the peak light intensity becomes the value to be calculated such that the peak light intensity $P_0$ in the case of single condensed position is divided by the number of condensed positions, the value of the case of FIG. 2 becomes a quarter of the original peak light intensity.

A light enters the condensed lens 20 with a predetermined angle (slanted angle) to the optical axis of the condensed lens 20 from the collimating lens 13A, 13B by the first shift. As a preferable slanted angle, 0.25 to 2 degrees as absolute values are exemplified. If a slanted angle is in the range from 0.25 to 2 degrees as absolute values, the area of the light condensed position SP (refer to FIG. 4A) does not become so large on the phosphor wheel 30. In the embodiment as shown in FIG. 3C, it is not limited to the shift with the same shifting amount. The first shift can be made with different shifting amount respectively.

In this embodiment, in FIGS. 3A and 3C, a focal length of the collimating lens 13A which forms the lens array 14A of the first light source 10A as indicated at the lower part of FIG. 3C is different from a focal length of the collimating lens 13B which forms of the lens array 14B of the second light source 10B as indicated at the upper part of FIG. 3C. In more detail, a curvature radius of the first collimating lens 13A which corresponds to the first light source 10A is larger than a curvature radius of the second collimating lens 13B which corresponds to the second light source 10B. Therefore, the first collimating lens 13A which has the larger curvature radius forms a larger image at the light condensed position (that is, the condensed shape is made larger) than the second collimating lens 13B.

Accordingly, by making different the focal length of the collimating Lens, an effect to be similar to the above mentioned second shift. With referring to FIG. 2, the condensed shape is compared when a light emitted the first light source 10A and the second light source 10B is condensed onto the phosphor wheel 30 by the condenser lens 20. As illustrated in FIG. 2, a length of the axis of the oval shape with horizontal longer axis which is formed by the first light source 10A is longer than a length of the axis of the oval shape with vertical longer axis which is formed by the second light source 10B.

Accordingly, in this embodiment, it is also possible to obtain a condensed shape (beam shape) with an aspect ratio whose horizontal length is longer (or whose vertical length is longer) on the phosphor wheel 30 which is the light condensed position formed by the condensed lens 20. Therefore, it is possible to obtain a condensed shape (beam shape) having any desired size and any desired aspect ratio by selecting the focal length of the collimating lens and the position of the collimating lens from the focusing position adequately. While a condensed shape (beam shape) having a dimension of 1.5 mm length×2 mm width can be exemplified as one example of the desired size and aspect ratio, it is not limited thereto.

As mentioned above, since the focal length of the first collimating lens 13A which forms the first lens array 14A of the first light source 10A in which the direction of the short axis of the condensed shape thereof is the first direction is different from the focal length of the second collimating lens 13B which forms the second lens array 14B of the second light source 10B in which the direction of the short axis of the condensed shape thereof is the second direction, it is possible to obtain a condensed shape (beam shape) with a desired size and a desired aspect ratio at the condensed position by the condenser lens 20.

As mentioned above, in another embodiment as illustrated in FIGS. 3A, 3C, in the first light sources 10A which utilizes the plurality of the laser diodes 12A and lens arrays 14A and the second light sources 10B which utilizes the plurality of the laser diodes 12B and lens arrays 14B, it is possible to suppress degradation of the emission efficiency of phosphor, and further in the condensed position, it is possible to obtain the condensed shape (beam shape) with the desired size and the desired aspect ratio at the condensed position. Since the lights are condensed onto the different positions by the first shift, the size of the condensed shape (beam shape) can also be adjusted.

In this embodiment, the light source at least includes two of the first light sources 10A in which the direction of the first shift is different by 180 degrees, and two of the second light sources 10B in which the direction of the first shift is different by 180 degrees, it is possible to obtain two condensed shapes (beam shapes) of the first light source 10A located at the symmetric positions with respect to the optical axis of the condensed lens 20 and two condensed shapes (beam shapes) of the second light source 10B located at the symmetric positions with respect to the optical axis of the condensed lens 20. Accordingly, it is possible to obtain the condensed shape (beam shape) which spreads with a certain angle around the optical axis of the condenser lens 20.

Further, since the first shift is made in the direction of the short axis of the condensed shape of the laser diode 12A, 12B, a light emitted from each laser diode does not interfere with each other, and it is possible to suppress increase of a light density adequately at the light condensed position.

Further, since the first direction and the second direction are different by 90 degrees, it is possible to obtain a condensed shape (beam shape) with a desired aspect ratio by adjusting the second shift between the first lens array 14A and the second lens array 14B or a distance from the focusing position.

In another embodiment as illustrated in FIGS. 3A, 3B, while the first lens array 14A of the first light source 10A and the second lens array 14B of the second light source 10B are placed at the defocusing position which is located closer to the laser diode 12A, 12B than the focusing position, the first lens array 14A and the second lens array 14B can adversely be positioned at the defocusing position which is located farther from the laser diode 12A, 12B than the focusing position. Further, both of the lens arrays 14A, 14B can be positioned at the focusing position. In this case, the direction of the short axis of the condensed shape corresponds to the direction of the short axis of the near field pattern, not the short axis of the far field pattern.

While the light source apparatus having four light sources is exemplified in this embodiment, it is not limited thereto, and any other light source apparatus having any number of light sources is included in the present invention. For example, it can have a plurality of pairs of light sources in which one light source without the first shift is placed at the optical axis of a condenser lens and another light source with the first shift is placed around the optical axis of a condenser lens. In the present invention, a light source can be placed at any position so that the short axis of the condensed shape thereof can have arbitrary direction.

While the lens array formed by a plurality of collimating lenses is exemplified in the above mentioned embodiment, it is not limited thereto. As shown in the collimating lens of FIG. 6, individual collimating lenses 13A, 13B (the right part of FIG. 6) can be used instead of the lens array 14A, 14B (the left part of FIG. 6). In this case, individual collimating lenses 13A, 13B are placed in the housing instead of the lens array 14A, 14B. The other configuration is basically the same as the above mentioned one embodiment.

Thus, a light source apparatus 1 has a plurality of light sources 10A, 10B each including a laser diode 12 A, 12B and a collimating lens 13A, 13B which corresponds to the laser diode 12A, 12B, a condenser lens 20 which condenses lights emitted from the light sources 10A, 10B, and a phosphor wheel 30 having a phosphor. Such phosphor wheel 30 transmits a light which is emitted from the condenser lens 20. At least in a part of the plurality of light sources 10 A, 10B, the collimating lens 13A, 13B and the laser diode 12A, 12B are placed with the first shift such that an optical axis of the collimating lens 13A, 13B is shifted from an optical axis of a light emitted from the laser diode 12A, 12B in the direction perpendicular to the optical axis of the emitted light. The laser diodes 12A, 12B include a first laser diode 12A in which a direction of a short axis of a condensed shape thereof is placed in a first direction, and a second laser diode 12B in which a direction of a short axis of a condensed shape thereof is placed in a second direction which is different from the first direction. The focal length of the collimating lens 13A which corresponds to the first laser diode 12A is different from the focal length of the collimating lens 13B which corresponds to the second laser diode 12B.

According to this embodiment, since the collimating lens 13A, 13B is placed with the first shift such that the optical axis of the collimating lens 13A, 13B is shifted from the optical axis of the light emitted from the corresponding laser diode 12A, 12B in the direction perpendicular to the optical axis of the emitted light, lights emitted from the plurality of light sources are condensed onto different positions on the phosphor wheel 30 (that is "on the phosphor") by the condenser lens 20. Therefore, a light intensity at the light condensed position on the phosphor can be lowered, so that a light which is emitted from the phosphor can be used efficiently.

Further, since the focal length of the collimating lens 13A which corresponds to the first laser diode 12A in which the direction of the short axis of the condensed shape thereof is the first direction is different from the focal length of the collimating lens 13B which corresponds to the second laser diode 12B in which the direction of the short axis of the condensed shape thereof is the second direction, a size of the condensed shape (beam shape) is different, and it is possible to obtain a condensed shape (beam shape) with a desired size and a desired aspect ratio on the phosphor wheel 30 (thus, on the phosphor) which is the condensed position by the condenser lens 20.

As mentioned above, according to this embodiment, in the plurality of light sources 10A, 10B which utilize the laser diode 12A, 12B and the collimating lens 13A, 13B, it is possible to suppress degradation of the emission efficiency of phosphor, and further in the condensed position, it is possible to obtain the condensed shape (beam shape) with the desired aspect ratio at the condensed position. Since the lights are condensed onto the different positions by the first shift, the size of the condensed shape (beam shape) can be adjusted.

According to this embodiment, in the pair of individual laser diode 12A, 12B and individual collimating lens 13A, 13B, since the first shift and the second shift with a different shifting amount or a different shifting direction can be made, more detailed adjustment can be achieved.

Figure 5A:
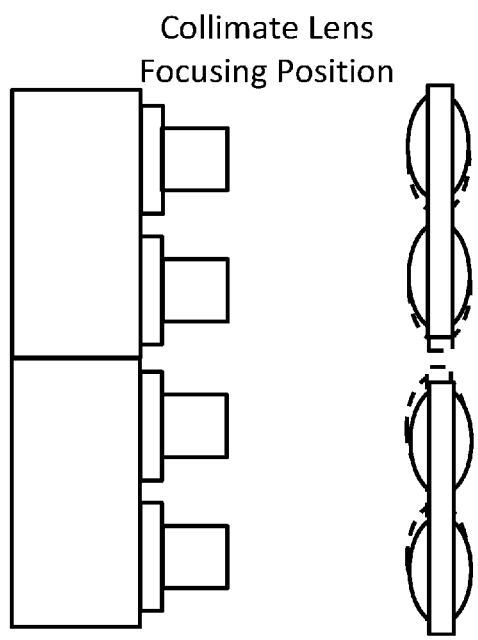
FIG. 5A illustrates a schematic diagram in a case that a collimating lens is placed at the focusing position in a lens array which is formed by the plurality of collimating lenses.
Figure 5B:
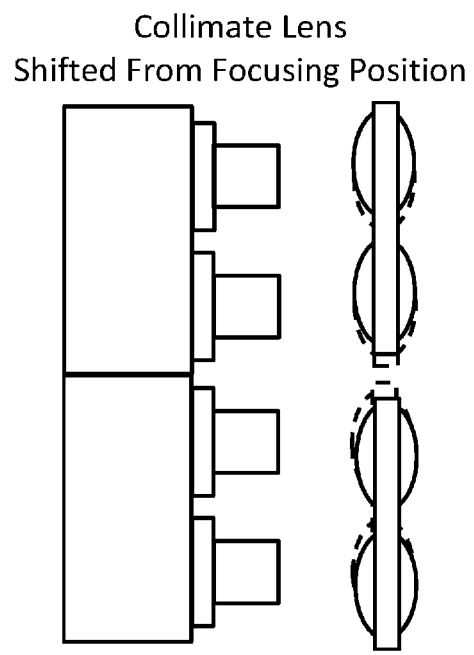
FIG. 5B illustrates a schematic diagram in a case that a collimating lens is placed with a shift from the focusing position in a lens array which is formed by the plurality of collimating lenses.
Figure 5C:
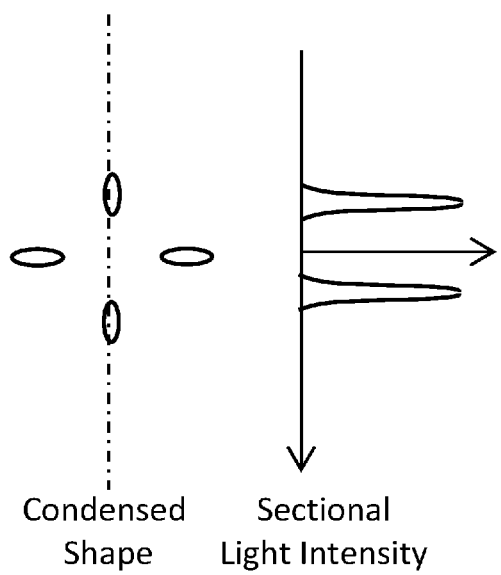
FIG. 5C illustrates a figure for describing a shape and a light intensity distribution (sectional light intensity) of the light condensed position in the case of FIG. 5A.
Figure 5D:
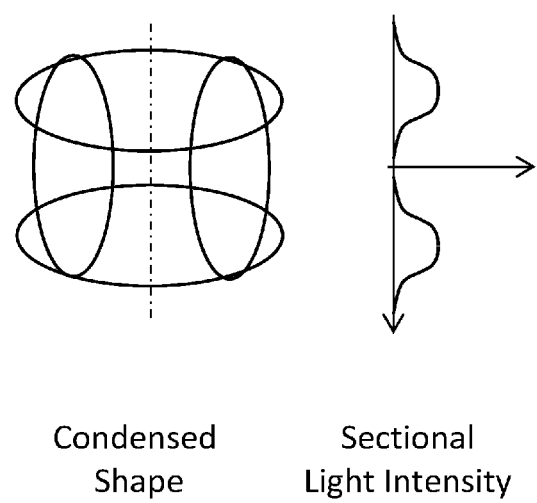
FIG. 5D illustrates a figure for describing a shape and a light intensity distribution (sectional light intensity) of the light condensed position in the case of FIG. 5B.

Next, relationship between the collimating lens position and the light intensity is described with referring to FIGS. 5A to 5D. As illustrated in FIG. 5A, if the collimating lens is placed at the focusing position, the condensed shape at the light condensed position is small and the peak light intensity is high (light density is high) as illustrated in FIG. 5C. On the contrary, as illustrated in FIG. 5B, if the collimating lens is placed at the position shifted from the focusing position, the condensed shape at the light condensed position is large and the peak light intensity is low (light density is low) as illustrated in FIG. 5D. Therefore, in addition to the effect of the first shift such that lights emitted from the condensed lens 20 are condensed onto different positions on the phosphor, and thereby reducing the light density, the light density can be further reduced by making the area of the light condensed position large according to the shift from the focusing position. Accordingly, a light emitted from the phosphor can be used efficiently.

Further, the condensed shape (beam shape) with a desired aspect ratio can be formed by changing the shifting amount from the focusing position in the first direction and the second direction according to the second shift.

In FIG. 5C, while the condensed shape in the case that the collimating lens is placed at the focusing position is schematically illustrated smaller, it is possible to place the collimating lens in the focusing position according to the usage.

Figure 7:
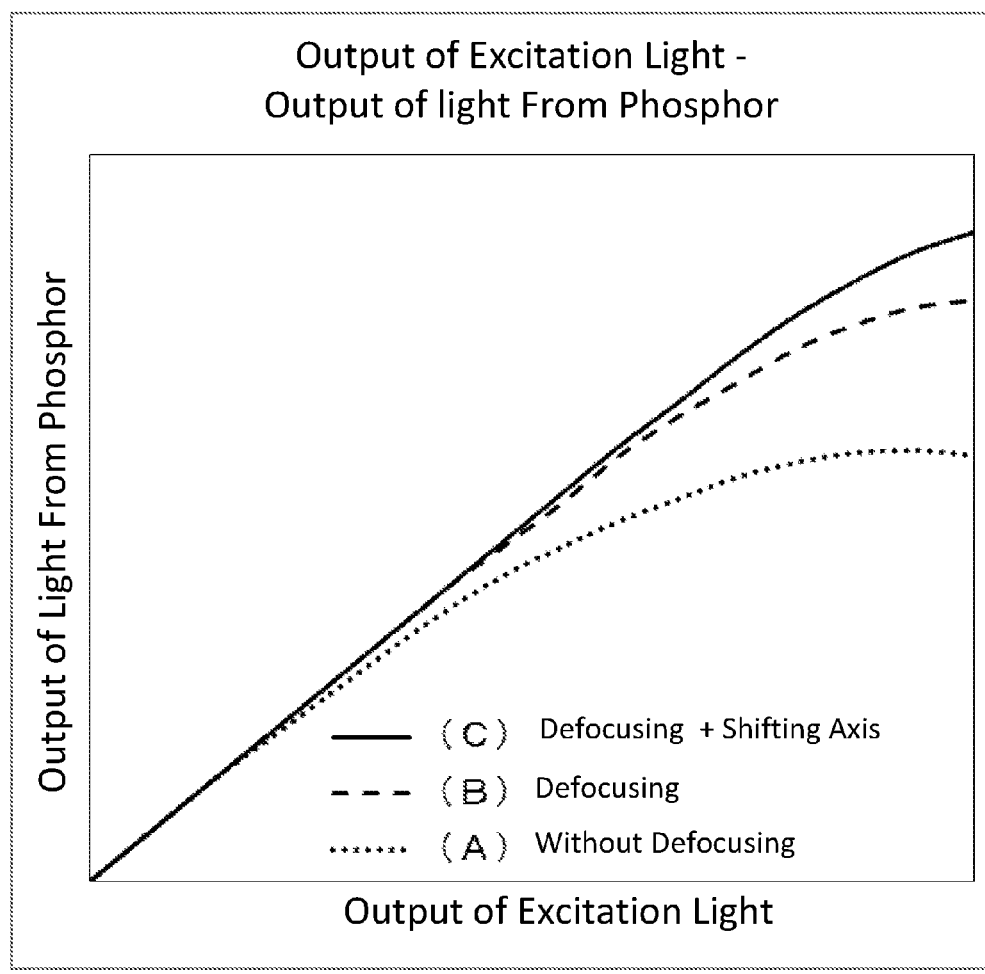
FIG. 7 illustrates a graph for describing a light intensity of an excitation light and a light intensity of a light emitted from a phosphor in the embodiment of the present invention.

Next, with referring to a graph of FIG. 7, an output efficiency of the phosphor in the case of the first shift and the shift of the collimating lens from the focusing position (defocusing) is described.

The graph of FIG. 7 illustrates relationship between an optical output of the light emitted from the phosphor and an optical output of the excitation light emitted from the light source 10. A fine dotted line indicated by (A) shows the case that neither the first shift nor the defocusing is performed. A dotted line indicated by (B) shows the case that only the defocusing is performed. A solid line indicated by (C) shows the case that both the first shift and the defocusing are performed.

In the case as indicated by the fine dotted line of (A) such that neither the first shift nor the defocusing is performed, when the output of the excitation light is increased, the output of the light from the phosphor reached the peak and then the output is decreased. In the case as indicated by the dotted line of (B) such that the defocusing is performed but the first shift is not performed, when the output of the excitation light is increased, the output of the light from the phosphor is also increased, but gradually saturated. On the contrary, in the case as indicated by the solid line of (C) such that both the first shift and the defocusing are performed, when the output of the excitation light is increased, it can suppress the saturation of the optical output of the light from the phosphor, and thus the phosphor can be used effectively even if an output from the light source 10 is high. This is because the light density can be lowered at the light condensed position SP, and thus the degradation of the emission efficiency of phosphor can be sufficiently suppressed.

Accordingly, combining the first shift and the defocusing allows lights emitted from the plurality of light sources 10 to be condensed onto different positions respectively and the area of the light condensed position of the light from each light source 10 to be large enough, so that the light density can sufficiently be lowered and the degradation of the emission efficiency of phosphor can be sufficiently suppressed.

As mentioned above, in the light source apparatus 1 according to the embodiment of the present invention, by the first shift, the light condensed positions of the light emitted from the plurality of light source 10 are varied, and thereby lowering the light density at the light condensed position. Further, by the defocusing such as shifting the location of the collimating lens 13, the shape of the light condensed position SP of the phosphor can be enlarged without loss of the etendue, and thus the light density at the light condensed position SP can be lowered. Accordingly, it can sufficiently suppress the degradation of the emission efficiency of phosphor, and the phosphor can be used efficiently. Further, since the plurality of light sources 10 having the same shape can be incorporated with changing its arrangement, the productivity can be prevented from being lowered.

The number of the light source 10 is not limited to that of the above mentioned embodiments, but can be any number as long as the number is 4 or more. The number of the laser diode 12 in the light source 10 can be any number as long as the number is 2 or more.

In the above mentioned embodiment, it is said that the first direction and the second direction are different by 90 degrees. It means that the angle formed by the first direction and the second direction is 90 degrees.

Figure 8:
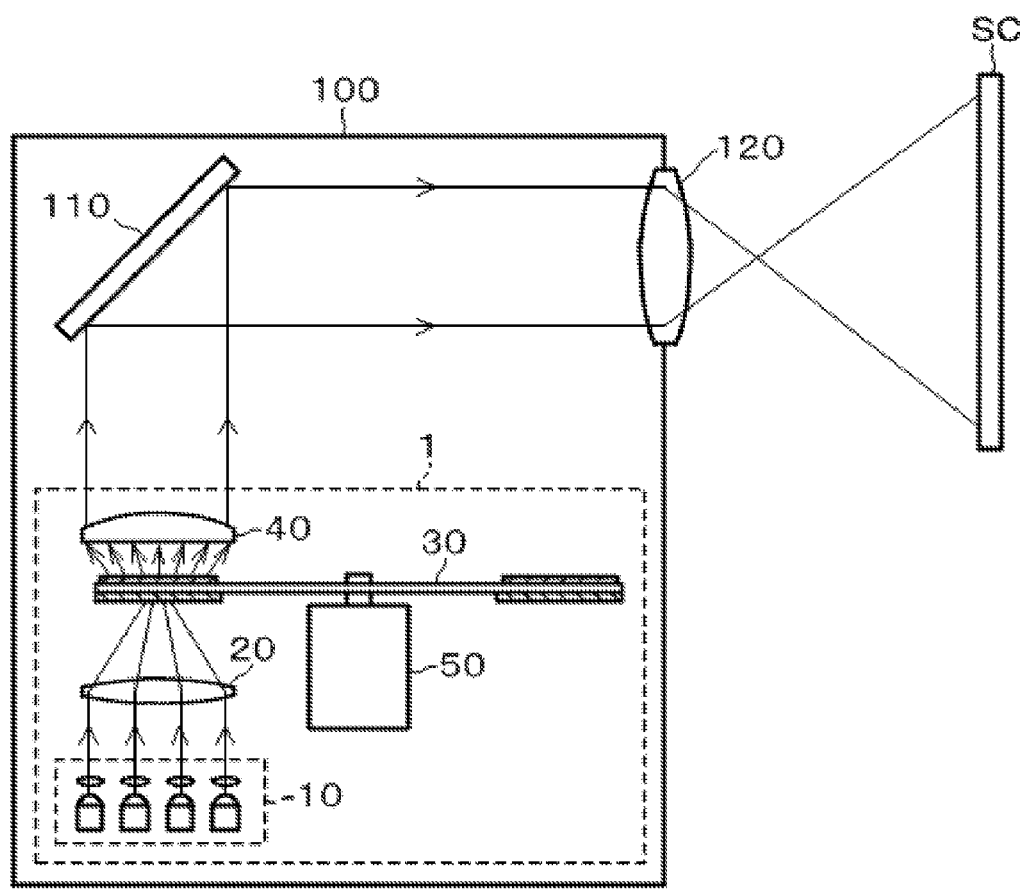
FIG. 8 illustrates a schematic diagram for describing a configuration of a projector which includes the light source apparatus. according to the embodiment of the present invention.

Next, with referring to FIG. 8, a case that the above mentioned light source apparatus 1 is used as a light source apparatus for the DLP projector of one-chip type is described. FIG. 8 illustrates a schematic diagram for describing a configuration of a projector 100 having the light source apparatus 1 according to the above mentioned embodiments, and it is schematic plan view seeing the light source apparatus 1 and the projector 100 from the above. The light source apparatus 1 is schematically described in FIG. 8, and the feature as shown in 1A, 1C, 3A, 3C etc. is not described.

In FIG. 8, the light which is emitted from the light source apparatus 1 is reflected by DMD element (Digital Micromirror Device) 110 which is a light modulating element, the reflected light forms an image, and thereby forming the images, and then the image is enlarged and projected to the screen SC by a projecting lens 120 which acts as a projecting device. In the DMD element 110, micro mirrors which correspond to each pixel of the images projected on the screen are arranged in matrix. The light projected to the screen can be on/off controlled in micro seconds by changing the inclined angle of each of the micro mirrors.

Further, it can change the intensity of the light which enters the projecting lens 120 according to the ratio between the on time of each micro mirror and the off time of each micro mirror, and thus achieving the gradation display based on the image data projected to the screen.

While the DMD element is used as a light modulating element in this embodiment, it is not limited thereto, and any other light modulating element can be applied according to intended use. A light source apparatus and a projector according to the present invention are not limited to the above mentioned embodiments, but various other embodiments are included in the present invention.

While the present invention has been described according to the embodiments with a certain degrees of details, contents of disclosure of the embodiments shall be varied in details of the configuration, and the combination of elements and the change of order in the embodiment can be realized without deviating from the scope of the claims and concepts of the present invention.

DESCRIPTION OF REFERENCE NUMBERS

1 Light Source Apparatus
10 Light Source
10A First Light Source
10B Second Light Source
11 Housing
12 Laser diode
12A First Laser diode
12B Second Laser diode
13 Collimating lens
13A First Collimating lens
13B Second Collimating lens
14 Lens Array
14A First Lens Array
14B Second Lens Array
20 Condenser lens
21 Optical Axis of Condenser lens
30 Phosphor Wheel
31 Dielectric Film
32 Phosphor
40 Receiving Lens
50 Rotary Driving Apparatus
50a Rotating axis
60 Heat dissipation plate (Supporting Member)
100 Projector
110 DMD Element
120 Projecting Lens
SC Screen
SP Light Condensed Position
FL Phosphor Position

What is claimed is:

1. A light source apparatus, comprising:
   a plurality of light sources each including a laser diode and a collimating lens which corresponds to said laser diode;
   a condenser lens which condenses lights emitted from said light sources; and
   a phosphor wheel having a phosphor, said phosphor wheel transmitting a light which is emitted from said condenser lens,
   wherein at least in a part of said plurality of light sources, said collimating lens and said laser diode are placed with a first shift such that an optical axis of said collimating lens is shifted from an optical axis of a light emitted from said laser diode in the direction perpendicular to the optical axis of the emitted light in such a manner that the light from the first light source and the light from the second light source are condensed onto different positions on the phosphor wheel by the condenser lens,
   wherein said laser diodes include a first laser diode in which a direction of a short axis of a condensed shape thereof is placed in a first direction, and a second laser diode in which a direction of a short axis of a condensed shape thereof is placed in a second direction which is different from the first direction, and wherein said collimating lens which corresponds to said first laser diode and said collimating lens which corresponds to said second laser diode are placed with a second shift in a direction of the optical axis of said collimating lens.

2. A light source apparatus, comprising:

a plurality of light sources each including a laser diode and a collimating lens which corresponds to said laser diode;

a condenser lens which condenses lights emitted from said light sources; and a phosphor wheel having a phosphor, said phosphor wheel transmitting a light which is emitted from said condenser lens, wherein at least in a part of said plurality of light sources, said collimating lens and said laser diode are placed with a first shift such that an optical axis of said collimating lens is shifted from an optical axis of a light emitted from said laser diode in the direction perpendicular to the optical axis of the emitted light in such a manner that the light from the first light source and the light from the second light source are condensed onto different positions on the phosphor wheel by the condenser lens, wherein said laser diodes include a first laser diode in which a direction of a short axis of a condensed shape thereof is placed in a first direction, and a second laser diode in which a direction of a short axis of a condensed shape thereof is placed in a second direction which is different from the first direction, and wherein a focal length of said collimating lens which corresponds to said first laser diode is different from a focal length of said collimating lens which corresponds to said second laser diode.

3. A light source apparatus, comprising:

a light source having a plurality of laser diodes and a lens array formed by a plurality of collimating lenses, said light source including a first light source in which a direction of a short axis of a condensed shape thereof is placed in a first direction and a second light source in which a direction of a short axis of a condensed shape thereof is placed in a second direction which is different from the first direction;

a condenser lens which condenses lights emitted from said first light source and said second light source; and a phosphor wheel having a phosphor, said phosphor wheel transmitting a light which is emitted from said condenser lens, wherein in said first light source and said second light source, said lens array and said laser diode are placed with a first shift such that an optical axis of said collimating lens which forms said lens array is shifted from an optical axis of a light emitted from said laser diode which corresponds to said collimating lens in the direction perpendicular to the optical axis of the emitted light in such a manner that the light from the first light source and the light from the second light source are condensed onto different positions on the phosphor wheel by the condenser lens, and wherein said lens array of said first light source and said lens array of said second light source are placed with a second shift in a direction of the optical axis of said collimating lens.

4. A light source apparatus, comprising:

a light source having a plurality of laser diodes and a lens array formed by a plurality of collimating lenses, said light source including a first light source in which a direction of a short axis of a condensed shape thereof is placed in a first direction and a second light source in which a direction of a short axis of a condensed shape thereof is placed in a second direction which is different from the first direction;

a condenser lens which condenses lights emitted from said first light source and said second light source; and a phosphor wheel having a phosphor, said phosphor wheel transmitting a light which is emitted from said condenser lens, wherein in said first light source and said second light source, said lens array and said laser diode are placed with a first shift such that an optical axis of said collimating lens which forms said lens array is shifted from an optical axis of a light emitted from said laser diode which corresponds to said collimating lens in the direction perpendicular to the optical axis of the emitted light in such a manner that the light from the first light source and the light from the second light source are condensed onto different positions on the phosphor wheel by the condenser lens, and wherein a focal length of said collimating lens which forms said lens array of said first light source is different from a focal length of said collimating lens which forms said lens array of said second light source.

5. The light source apparatus according to claim 3, wherein said light source at least includes two of said first light sources in which a direction of said first shift is different by 180 degrees, and two of said second light sources in which a direction of said first shift is different by 180 degrees.

6. The light source apparatus according to claim 4, wherein said light source at least includes two of said first light sources in which a direction of said first shift is different by 180 degrees, and two of said second light sources in which a direction of said first shift is different by 180 degrees.

7. The light source apparatus according to claim 1, wherein said first shift is made in the direction of the short axis of the condensed shape of said laser diode.

8. The light source apparatus according to claim 2, wherein said first shift is made in the direction of the short axis of the condensed shape of said laser diode.

9. The light source apparatus according to claim 3, wherein said first shift is made in the direction of the short axis of the condensed shape of said laser diode.

10. The light source apparatus according to claim 4, wherein said first shift is made in the direction of the short axis of the condensed shape of said laser diode.

11. The light source apparatus according to claim 1, wherein said first direction and said second direction are different by 90 degrees.

12. The light source apparatus according to claim 2, wherein said first direction and said second direction are different by 90 degrees.

13. The light source apparatus according to claim 3, wherein said first direction and said second direction are different by 90 degrees.

14. The light source apparatus according to claim 4, wherein said first direction and said second direction are different by 90 degrees.

15. The light source apparatus according to claim 1, wherein said light sources are mounted on a same surface of a supporting member.

16. The light source apparatus according to claim 15, wherein said supporting member works as a heat dissipation member.

17. The light source apparatus according to claim 1, wherein the wavelength of lights emitted from said light sources ranges from 370 to 500 nm.

18. The light source apparatus according to claim 1, wherein one of said phosphors is a phosphor which emits a light including a red light.

19. A projector, comprising:
the light source apparatus according to claim 1;
a light modulating device which modulates lights emitted from the light source apparatus in the plurality of wavelength ranges to form an image based on an image data; and
a projecting device which enlarges and projects the image.

20. A projector, comprising:
the light source apparatus according to claim 2;
a light modulating device which modulates lights emitted from the light source apparatus in the plurality of wavelength ranges to form an image based on an image data; and
a projecting device which enlarges and projects the image.

* * * * *